United States Patent
Valpola (10) Patent No.: US 11,620,511 B2
(45) Date of Patent: Apr. 4, 2023

(54) SOLUTION FOR TRAINING A NEURAL NETWORK SYSTEM

(71) Applicant: CANARY CAPITAL LLC, Wilmington, DE (US)

(72) Inventor: Harri Valpola, Helsinki (FI)

(73) Assignee: Canary Capital LLC, Wilmington, DE (US)

( * ) Notice: Subject to any disclaimer, the term of this patent is extended or adjusted under 35 U.S.C. 154(b) by 808 days.

(21) Appl. No.: 16/486,576

(22) PCT Filed: Feb. 14, 2018

(86) PCT No.: PCT/FI2018/050101
§ 371 (c)(1),
(2) Date: Aug. 16, 2019

(87) PCT Pub. No.: WO2018/150089
PCT Pub. Date: Aug. 23, 2018

(65) Prior Publication Data
US 2020/0234116 A1    Jul. 23, 2020

(30) Foreign Application Priority Data
Feb. 17, 2017    (FI) .................................... 20175142

(51) Int. Cl.
*G06N 3/08*    (2006.01)
*G06N 3/04*    (2006.01)
(52) U.S. Cl.
CPC ............ *G06N 3/08* (2013.01); *G06N 3/0454* (2013.01)

(58) Field of Classification Search
CPC ............................... G06N 3/08; G06N 3/0454
See application file for complete search history.

(56) References Cited

U.S. PATENT DOCUMENTS

| | | | |
|---|---|---|---|
| 2014/0079297 A1* | 3/2014 | Tadayon | G06V 40/172 382/118 |
| 2016/0078339 A1 | 3/2016 | Li et al. | |
| 2017/0024641 A1 | 1/2017 | Wierzynski | |

(Continued)

FOREIGN PATENT DOCUMENTS

WO    2014/114116 A1    7/2014

OTHER PUBLICATIONS

Glorot et al., "Understanding the difficulty of training deep feedforward neural networks", Proceedings of the Thirteenth International Conference on Artificial Intelligence and Statistics, 2010, PMLR 9:249-256; <http://jmlr.org/proceedings/papers/v9/glorot10a/glorot10a.pdf>.

(Continued)

*Primary Examiner* — David Bilodeau
(74) *Attorney, Agent, or Firm* — Young Basile Hanlon & MacFarlane, P.C.

(57) ABSTRACT

Disclosed is a computer-implemented method for training a neural network system including an original neural network and a label generator. The method is based on an idea that the neural network system is trained by a sequence of training steps where at each training step at least one of a plurality of operations is performed and each of the operations gets performed at least once during training of the neural network system. Also disclosed are a neural network system and a computer program product.

21 Claims, 2 Drawing Sheets

(56) References Cited

U.S. PATENT DOCUMENTS

2018/0204111 A1* 7/2018 Zadeh .................. G06N 3/0436
2020/0184278 A1* 6/2020 Zadeh .................. G06K 9/6264

OTHER PUBLICATIONS

International Search Report, dated Apr. 25, 2018, from corresponding PCT application No. PCT/FI2018/050101.
Zhiting et al., "Harnessing Deep Neural Networks with Logic Rules ", Proceedings of the 54th Annual Meeting of the Association for Computational Linguistics, 2016, pp. 2410-2420, vol. 1: Long Papers, XP055433576.
Tarvainen et al., "Weight-averaged consistency targets improve semi-supervised deep learning results", arxiv.org, 2017, XP080754467.
Finnish Search Report, dated Sep. 15, 2017, from corresponding FI application No. 20175142.
Bennett et al., "Exploiting Unlabeled Data in Ensemble Methods", Proceedings of the eighth ACM SIGKDD International conference on Knowledge discovery and data mining (KDD'02) [online], 2002, pp. 289-296, <http://dl.acm.org/citation.cfm?id=775090>.
Laine et al., "Temporal Ensembling for Semi-Supervised Learning", ARXIV [online], 2016, <https://arxiv.org/abs/1610.02242v2>.
Mallapragada et al., "SemiBoost: Boosting for Semi-Supervised Learning", IEEE Transactions on Pattern Analysis and Machine Intelligence, 2009, vol. 31, No. 11, pp. 2000-2014, <http://ieeexplore.ieee.org/document/4633363/>.

* cited by examiner

SOLUTION FOR TRAINING A NEURAL NETWORK SYSTEM

TECHNICAL FIELD

The invention concerns in general the technical field of neural networks. More particularly, the invention concerns at least some aspects relating to training a neural network.

BACKGROUND

Training of a neural network model is a prerequisite for applying the neural network model to any practical use. The fundamental thinking behind the training is that layers of non-linear hidden units between the input of the neural network and the output of the neural network are prepared so that a desired result may be achieved. The preparation of the units is performed so that a weight for each unit is determined during the training phase. For the training it is used so called training dataset, which consists of training cases. A training case contains an input. Some of the training cases have a known output, a "label", while some do not ("labeled" vs. "unlabeled data"). The training dataset is processed by the neural network and the idea is to make the neural network to learn how to provide an output for unknown input data by generalizing the information it learns in the training phase from the training dataset. In addition to the weights of the network, its function and its training are determined by its structure ("architecture") and by its hyperparameters. The difference between the weights of the network and its hyperparameters is that the weights are adjusted automatically via the training process, whereas the hyperparameter values need to be set by the operator of the network manually, usually before training.

As referred above the idea behind the learning is to adjust, or adapt, the weights on the incoming connections of hidden units to learn feature detectors that enable the neural network model to predict the correct output when given an input vector. If the relationship between the input and the correct output is complicated and the network has enough hidden units to model it accurately, there will typically be many different settings of the weights that can model the training dataset almost perfectly, especially if there is only a limited amount of labeled training data. Each of these weight vectors will make different predictions on held-out test data and almost all of them will do worse on the test data than on the training data because the feature detectors have been tuned to work well together on the training data but not on the test data.

A further aspect relating to the training of the neural network a cost function needs to be decided. Specifically, the cost function is needed for evaluating the neural network's capability to make the prediction, as discussed above. The term cost function refers to a computation that calculates a distance between the network's prediction and the known output which the network tries to emulate. The choice of the cost function determines which sets of network weights are preferred over others on training.

As mentioned above, almost all weight vectors that model the training data almost perfectly will do worse on the test data than training dataset. This phenomenon happens due to so called overfitting problem, which occurs when the neural network under evaluation memorizes the training dataset rather than generalizing well to new input data. Further, it is known that the overfitting problem is more likely to happen when the complexity of the neural network increases.

To mitigate the overfitting problem, the processing of the data may be altered by randomly mutating the outputs of each feature detector of any combination of the layers during the training of the neural network. The random mutation may be an addition of a random value, a multiplication by a random value or any other function of the output and a random value.

Overfitting can be mitigated by providing the neural network with more labeled data. However, creating labels is a laborious, expensive and error prone task, and as a result the training of neural network is many times performed with inadequate number of labels. The problem of not having enough labels, and not having enough high-quality labels may be mitigated by generating additional labels ("generated labels") automatically during training. It is known that the network itself can act as a label generator, if the processing of the network is mutated as described above. The mutation is essential to this method, since it improves the expected value of targets generated by the label generator.

In case the neural network is configured to generate the additional labels its classification cost needs to be changed to take account of the original label and the generated labels. This can be done by taking a weighted average of the original classification cost and a consistency cost that considers the difference between the network's prediction and the generated label.

However, using the network itself as a label generator may be tricky in practice. Because the network itself is generating labels, they are biased towards itself. In addition, because the labels are generated by a noisy process, they have a high variance. To solve these problems, Laine & Aila (Temporal Ensembling for Semi-Supervised Learning, 2016) have proposed so called temporal ensembling. Targets are computed from exponential moving average (EMA) of model outputs over epochs. Since they are now formed with an implicit ensemble of models, this should reduce their variance and bias. However, since temporal ensembling updates targets only once per epoch, the learned information is added to targets only very slowly. The larger the dataset, the longer the span of the updates, and in the case of on-line learning, it is not clear how temporal ensembling can be used at all.

Hence, there is need to develop solutions which at least in part mitigate the drawbacks of the existing solutions.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a computer-implemented method, a neural network system and a computer program product for training a neural network system.

The objectives of the invention are reached by a method, an apparatus and a computer program as defined by the respective independent claims.

According to a first aspect, a computer-implemented method for training a neural network system comprising an original neural network and a label generator is provided, the method comprises: obtaining a number of training cases comprising input data and wherein at least one training case is labeled; training the neural network system by a sequence of training steps where at each training step at least one of the following operations is performed:

training the original network by processing a subset of the labeled training cases with labels;

generating a label with the label generator for a subset of the training cases and training the original network with the generated label;

updating the weights of the label generator based on its current weights and the weights of the original network in response to an outcome of the training of the original network;

and each of the operations gets performed at least once during training of the neural network system.

The training of the original network by processing each of the plurality of training cases may be performed by minimizing the combination of a classification cost between a predicted label by the original network and the original label and a consistency cost between the predicted label by the original network and the generated label by the label generator.

According to a second aspect, a neural network system is provided, the neural network system comprising one or more computers and one or more storage devices storing instructions that, when executed by the one or more computers, cause the one or more computers to perform: obtaining a number of training cases comprising input data and wherein at least one training case is labeled; training the neural network system by a sequence of training steps where at each training step at least one of the following operations is performed:

training the original network by processing a subset of the labeled training cases with labels;

generating a label with the label generator for a subset of the training cases and training the original network with the generated label;

updating the weights of the label generator based on its current weights and the weights of the original network in response to an outcome of the training of the original network;

and each of the operations gets performed at least once during training of the neural network system.

The one or more computers may be caused to perform the training of the original network by processing each of the plurality of training cases by minimizing the combination of a classification cost between a predicted label by the original network and the original label and a consistency cost between the predicted label by the original network and the generated label by the label generator.

According to a third aspect, a computer program product is provided, the computer program product comprising at least one computer-readable media having computer-executable program code instructions stored therein for performing the method as described above when the computer program product is executed on a computer.

The expression "a number of" refers herein to any positive integer starting from one, e.g. to one, two, or three.

The expression "a plurality of" refers herein to any positive integer starting from two, e.g. to two, three, or four.

The terms "first" and "second" do not denote any order, quantity, or importance, but rather are used to distinguish one element from another.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims.

Lists and groups of examples provided in the description given below are not exhaustive unless otherwise explicitly stated.

For describing at least some aspects of the present invention definitions are given to the used terminology:

Neural network: A computer system that takes an input or many inputs and produces an output or many outputs. The neural network comprises one or more layers, which may be composed in arbitrary ways. The operation of the neural network is defined by its layers and by the way the layers are composed. The operation of the neural network may include computation of its output, computation of updates to its weights, and other computations. The output of the network is also called a prediction.

Layer: A part of a neural network. The layer may perform any computation that it has been programmed to perform. The result of the operation may be based on at least some of the following: its inputs, on its weights, on noise, on the hyperparameters of the layer. The noise may be added to the computation on purpose, by accident, or it may be absent. The process of adding noise is called mutation, and it may be any deterministic or indeterministic operation. The layer may also be called an intermediate layer, a hidden layer or a feature detector.

Weight: A scalar value or an array of scalar values. The array may have an arbitrary number of dimensions and an arbitrary size. The weights may be persisted on computer memory or on other storage media. The weights may be altered by the process of training the neural network, or by other means.

Hyperparameter: A choice made to parametrize an operation of a layer, of a neural network, of other computer system, or of a part of a computer system.

Architecture: A chosen structure or composition of a neural network, of a neural network, of other computer system, or of a part of a computer system.

Dataset: Dataset is a set of examples. Each example may consist of an input and a label. Each example may contain other pieces of data as well.

Training data: Training data is a dataset that is used to train the neural network. An example in a training data is called a training example or a training case.

Label: A label is an optional part of an example of a dataset. The type of label data may be similar to one of the outputs of the network to be trained, and thus may be used with cost functions. The label may represent a category of the example or a scalar value. The label may have an arbitrary structure.

Labeled: Those training cases or other validation or testing cases in a dataset that have a label are collectively called labeled data.

Unlabeled: Those training cases or other validation or testing cases in a dataset that do not have a label are collectively called unlabeled data.

Overfitting: Typically many different settings of neural network weights will give similar predictions on training data. Each of these settings will make different predictions on held-out test data and almost all of them will do worse on the test data than on the training data because the network has been tuned to work well together on the training data but not on the test data. This phenomenon is called overfitting.

Optimization, optimizer, cost function: The weights of a neural network may be changed with the intention to it to perform a certain function. The change of the weights with this intention is called optimization, and the computation that performs this operation is called an optimizer. The operation of the optimizer may be guided by a choice of cost function. The cost function determines a value to be minimized or maximized by the optimization. The process of optimization may also be called training.

Classification cost: A cost function or the result of a cost function is called a classification cost if a label of a training example needs to be known for the result to be computed.

Consistency cost: A cost function or the result of a cost function is called a consistency cost if two different outputs of a network or multiple networks are needed in order for the result to be computed.

Subset: at least one and at most all elements of a set of elements. The element may refer to training cases.

Training step: An operation in which the weights of the network are updated once based on a training case.

Epoch: A sequence of training steps on which each example of the training data is used once.

On-line learning: Training based on a dataset that is continuously appended with new data encountered by the system.

VALID and SAME convolution: Convolution operations are often used in neural networks for example for image and audio processing (so called convolutional neural networks). The convolution can be VALID or SAME depending on the padding of border values. There is no padding with VALID convolution which means that the output size is smaller than the input size. With SAME convolution, zeros are added so that the output size is the same as input size.

Figure 1:
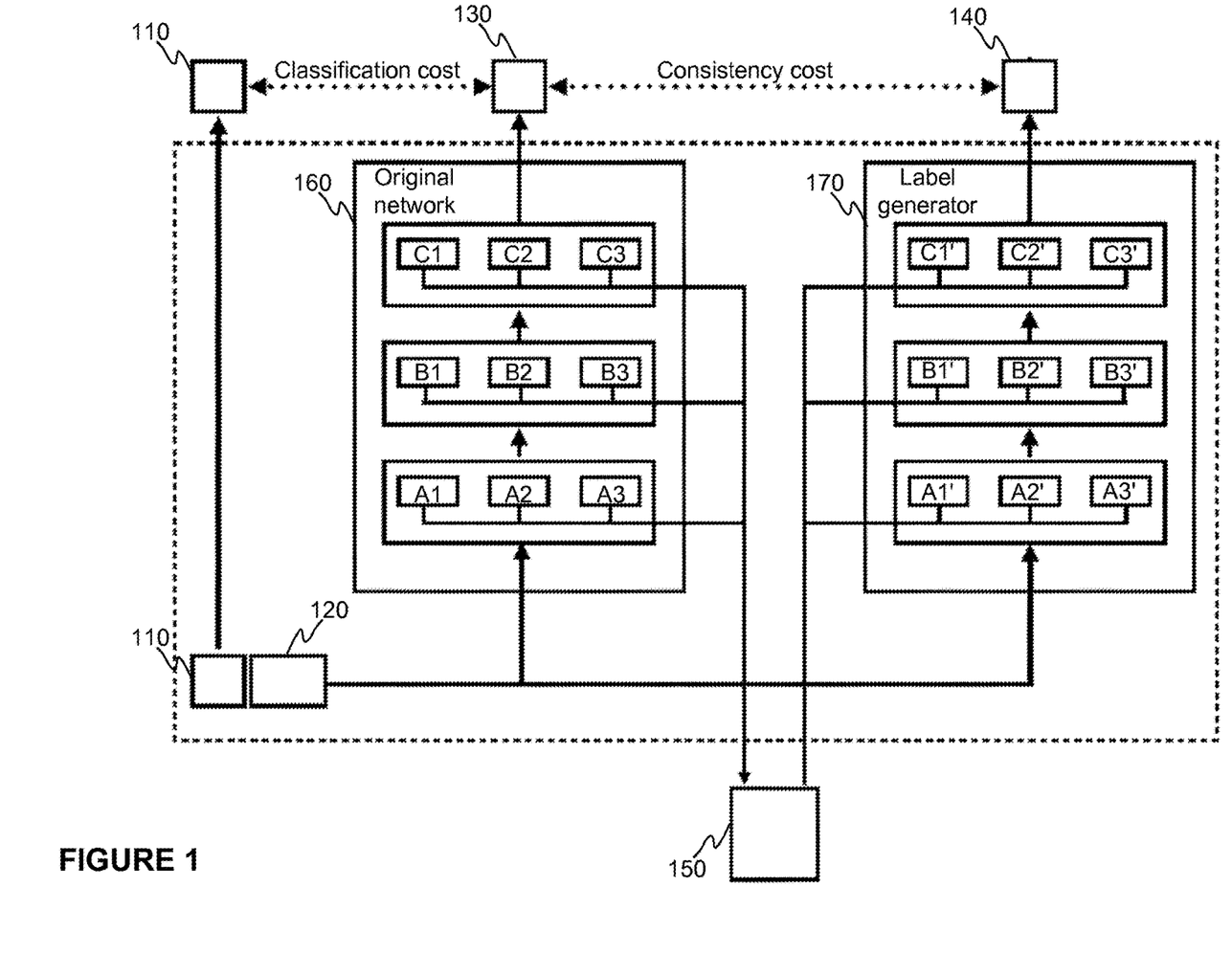
FIG. 1 illustrates schematically at least some aspects of a neural network system according an embodiment of the invention.

For describing a solution according to embodiments of the present invention an example of a neural network system structure applicable in the context of the present invention is schematically illustrated in FIG. 1. The neural network system comprises an original neural network structure 160 and a label generator neural network structure 170. As is known the neural networks comprise layers comprising units defined by weights for performing a predetermined operation. Each of the neural networks in FIG. 1 comprises three layers and each of the layers comprises three weights. The number of layers and the way they are composed may vary from the ones depicted in FIG. 1 and may be selected according to need. As an input to the system at least one training case is provided, which consists of an original label 110 and input data 120. These pieces of information are input to each of the neural networks, i.e. the original network 160 and the label generator 170. The original network 160 generates a predicted label whereas the label generator 170 generates a generated label 140 as an outcome. The difference between the original label 110 and the predicted label 130 is called a classification cost. The difference between the predicted label and the generated label is called a consistency cost. For determining a value representing the difference, i.e. the cost, an applicable cost function is selected for determining the costs. Moreover, the structure of FIG. 1 comprises a so called label generator weights updater 150, which may be configured to update weights in the label generator 170 at least in part based on weights of the original network 160.

Next, a method for training a neural network according to a present invention is described by referring to FIG. 1 in more detail. The neural network under training in the example for describing at least some aspects of the present invention has an architecture and hyperparameters that (to an extent) define how the neural network behaves during training, and that need to be decided before training the network.

Similarly, the user of the method according to the present invention may need to provide some primary hyperparameters for defining an operation of the neural network. The provision and definition of the hyperparameters may require some manual work, such as combining trial-and-error and good intuition for selecting the hyperparameters optimally for a need. According to an embodiment of the invention decision may be made at least on the following:

The smoothing coefficient of the exponential moving average weights. An example of such a hyperparameter value may be 0.999.

The type of cost function to use as the consistency cost function. Some non-limiting examples of an applicable cost function may be costs function based on mean square error or cross-entropy, for example.

Cost coefficients for the consistency cost and for the original cost of the network. The coefficient values in this regard may e.g. be 10.0 and 1.0.

Worthwhile to mention is also that it is important to balance the use of labels during training. If too much importance is given to the generated targets, the cost of inconsistency outweighs the cost of misclassification and prevents learning of new information. This can be done by carefully selecting a schedule for what values the consistency cost (and possibly other hyperparameters) takes during training.

Now, when the above described hyperparameters are selected for the neural network system as a prerequisite the training of the neural network system may be performed according to the method of the present invention. The method according to an example of the invention may comprise the steps illustrated in FIG. 2, which will next be described in more detail.

Figure 2:
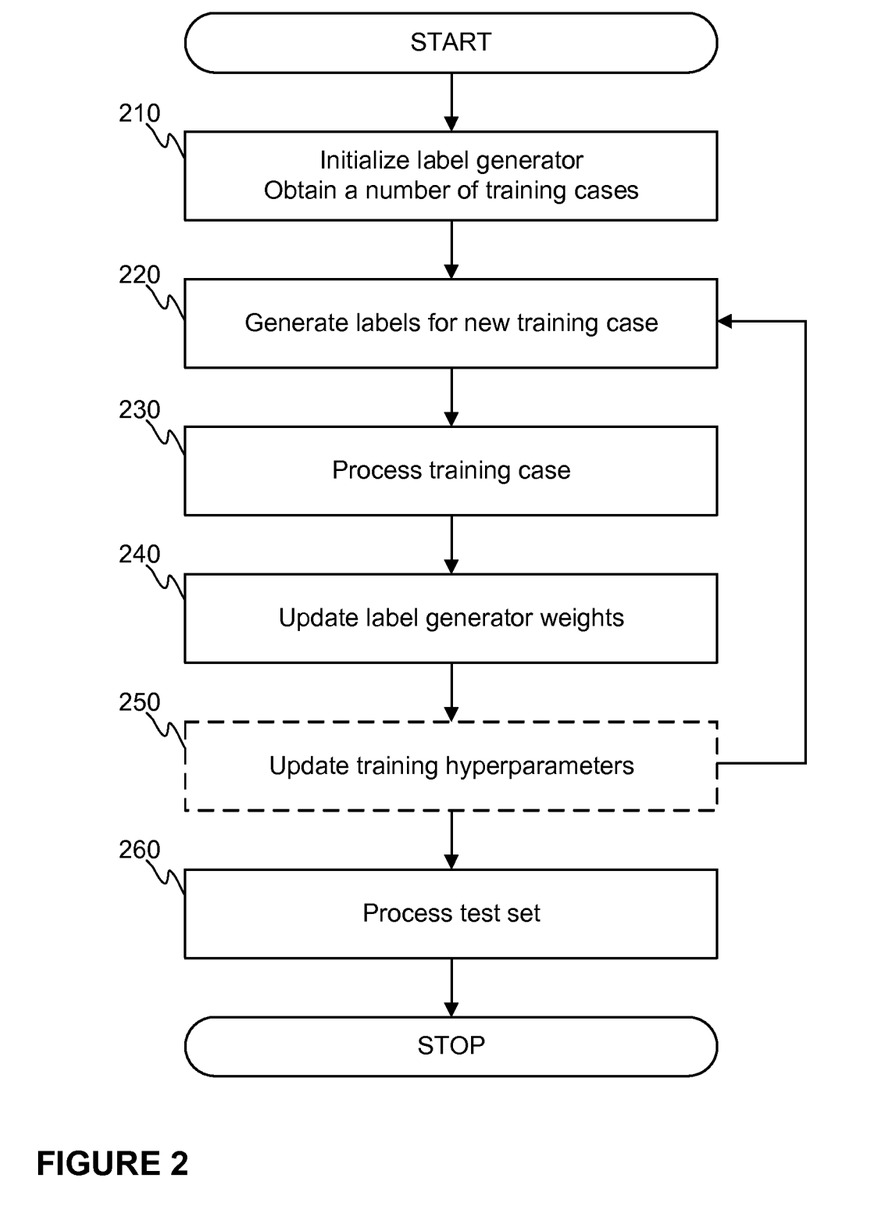
FIG. 2 illustrates schematically aspects relating to a method according to an embodiment of the invention.

Regarding step 210:

In step 210 the aim is to initiate a neural network corresponding to the neural network to be trained to generate labels. In other words, the label generator 170 is a neural network of a similar type as the original neural network 160 to be trained. By giving a set of fixed weights, the label generator neural network 170 may be configured to compute the same function as the original network 160. However, it does not share the weights of the original network 160.

At the beginning of the training, i.e. in step 210, the weights of the label generator 170 may be initialized to match the weights of the original network 160. However, the initialization of the weights of the label generator neural network 170 with the weights of the original network 160 is a non-limiting example, and the weights may be initialized in other ways too.

Moreover, a number of training cases is obtained. The training cases comprise at least input data, but at least one obtained training case is also labeled i.e. comprises an input label, or original label 110.

As a result the training of the neural network system may be initiated wherein the neural network system may be trained by a sequence of training steps, where at each training step at least one operation as is described is performed.

Regarding step 220:

In step 220 of the method the training case may be processed by the neural network dedicated to generating labels. The processing of the data may be altered by randomly mutating the outputs of the intermediate layers. The label generator 170 may output the generated label in response to the processing. The label generator 170 weights are not changed at this point.

Regarding step 230:

Next, the training case may be processed by the original network 160. The network 160 weights may be updated based on the weighted sum of the original cost function of the network and the auxiliary consistency cost function, which is configured to determine difference between the network's prediction and the generated label.

The training of the original network may be performed by processing a subset of the labeled training cases with labels.

Regarding step 240:

As the training is an iterative process after each training step, when the weights of the original network 160 have been changed, the weights of the label generator 170 may be changed, or updated, based on the weights of the original network 160. This may be performed by the label generator weights updater 150. There is a one-to-one correspondence between the weights of the original network 160 and the label generator 170. Each weight of the label generator 170 changes during training based only on its own value at that point, and the matching weight on the original network. According to the present invention the new weight may e.g. be the weighted average of the previous weight and the corresponding weight on the original network 160, where the averaging coefficient is the smoothing coefficient described above. It may be possible to utilize other ways to determine the new weight for the label generator 170.

In other words, the weights of the label generator may be updated based on its current weights and the weights of the original network in response to an outcome of the training of the original network.

Regarding step 250:

The step 250 is an optional step in the method according to the present invention. If the step 250 is included in the method, the hyperparameters of the original network, the label generator and the training costs may be updated after each training step based on the schedule that was decided at the beginning of the training (cf. arrow from step 250 back to step 220 in FIG. 1).

Regarding step 260:

An outcome after training is that there are two networks that may give predictions: the original neural network 160, and the label generator neural network 170. Since the label generator 170 is an averaged network of the original, it may give better predictions than the original neural network 160.

By summarizing at least part of the above description, the neural network system may be trained by a sequence of training steps where at each training step at least one of the following operations may be performed:

training the original network by processing a subset of the labeled training cases with labels;

generating a label with the label generator for a subset of the training cases and training the original network with the generated label;

updating the weights of the label generator based on its current weights and the weights of the original network in response to an outcome of the training of the original network;

and each of the operations gets performed at least once during training of the neural network system.

Further, the training of the original network by processing each of the plurality of training cases may be performed by minimizing the combination of a classification cost between a predicted label by the original network and the original label and a consistency cost between the predicted label by the original network and the generated label by the label generator.

The method according to the example as described above brings clear advantages compared to the prior art solution in that it needs less labels to reach comparable results as the prior art and in that if given the same number of labels, it gives better predictions than the prior art. In addition, the method gives better results when the quality of the labels is low. As a consequence, the manual process of labelling the training dataset is smaller and faster. The entire process of application development, measured from obtaining training data to producing a useful machine learning application, will be correspondingly shorter and less expensive.

In addition, because the label predictor is able to generate better labels earlier in the training process than the prior art, it will help train the original network faster. The prior art solution of averaging labels generated by the original network suffers from the problem that the labels are averaged only after the same training cases are processed again. This means that prior art solution cannot properly utilize a large number of unlabeled training cases. The present invention as described herein solves this problem by adding a separate label generator network which may be updated for every training case rather than having to wait until previously encountered training cases are processed again.

In addition, the technique enables applications that were not possible before. In many application areas humans don't know the correct label for all the data points and perfect labelling manually is not possible even if given infinite resources. By giving humans more leeway in the number and quality of labels, some of these application areas will become feasibly solvable by the present invention.

In addition, even in cases with plentiful high-quality labeled data, the accuracy of the generated predictions may be improved by the method according to the invention. The known labels typically give a 100% known probability for the preferred prediction of each training example. Even while this is technically true, the network in training may benefit from having a softer set of probabilities. For example, an image that looks like a horse and is by the human labeler known to be a horse, might still, based on the input image alone, be reasonably estimated to be a cow. The label generator 170 is able to generate labels with this softer knowledge and help the original network 160 to learn better. This may help improve the predictions on many application areas.

Next, the fundamental idea according to the present invention is described through an example wherein the inventive idea of the present invention is applied to image recognition system. Namely, the method according to an embodiment of the invention may be used for building an effective image recognition system. The image recognition is applied to Street View House Numbers. The goal in this application area is to learn to recognize digits in an image with the method according to the present invention.

The training data is a collection of 73257 images in 32×32 RGB pixel format. Some of the images have labels associated to them. The label is encoded by an array of ten scalar values describing the identity of the digit with one-hot encoding as detailed later. The training data is saved on a hard drive.

The structure of the original network 160 consists of the following layers:
input_layer (32×32×3)
normalization layer that scales the intensities of the pixels to have mean 0 and standard deviation 1 on each channel
data augmentation layer (described below)
Gaussian noise layer with standard deviation 0.15
convolutional layer with 128 channels
convolutional layer with 128 channels
convolutional layer with 128 channels
max pooling layer with kernel size 2×2 and stride 2
dropout layer with 0.5 percent probability
convolutional layer with 256 channels
convolutional layer with 256 channels
convolutional layer with 256 channels
max pooling layer with kernel size 2×2 and stride 2
dropout layer with 0.5 percent probability
convolutional layer with 512 channels using the VALID padding
convolutional layer with 256 channels
convolutional layer with 128 channels
average pooling layer with kernel size equal to the pixel dimensions of the layer input
fully connected layer with 10-dimensional softmax output.

All convolutional layers use kernel size 3×3 and SAME padding unless mentioned otherwise. All convolutional layers use a rectified linear unit nonlinearity. All padding layers use VALID padding unless mentioned otherwise. Layer normalization is applied to all layers.

The data augmentation layer translates images horizontally and vertically by a certain number of pixels. The horizontal translation is −2, −1, 0, 1, or 2 pixels, chosen uniformly in random. Similarly, the vertical translation is −2, −1, 0, 1, or 2 pixels, chosen uniformly in random.

The random mutation to the processing of the network is formed together by Gaussian noise on the input layer, the random augmentation on the data augmentation layer, and the Dropout noise on the dropout layers.

An initialization scheme is selected for the weights of the network. The initialization scheme in use in the example is the "Xavier initializer" described in
http://jmlr.org/proceedings/papers/v9/glorot10a/glorot10a.pdf. A variant is used where the random weights are taken from a Gaussian distribution.

As the classification cost a cross-entropy cost is selected to be used between the softmax output of the network and the original label of the data example. If the example is unlabeled, the classification cost is 0.

In the following at least some aspects to a structure of the label generator 170 and its combination with the original network 160 are given.

First, a smoothing coefficient 0.999 is selected for updating label generator weights.

As the consistency cost mean squared error between the softmax output of the original network 160 and the labels generated by the label generator 170 is selected. The total cost is now the weighted sum of the classification cost and the consistency cost.

An importance weight 1.0 is used for the classification cost. A schedule for the consistency cost is chosen so that it starts at 0.0, is then linearly grown to reach 100.0 at the beginning of training epoch 80. It is then kept constant until the end of the training. An epoch is the span of the training, during which all examples in the training data are processed once.

An optimizer to use for updating the weights of the network is selected. A chosen optimizer is AdamOptimizer. A learning rate 0.003, beta1 of 0.9, and beta2 of 0.999 are chosen as the AdamOptimizer hyperparameters.

The network is selected to be trained for 300 epochs.

The structure of the neural network is in the example of the invention described as an abstract computational graph using Python programming language and Tensorflow library. The Tensorflow library is used to convert the abstract computation graph into computer code that can be run on a computer with a central processing unit and, optionally, a graphical processing unit. The Python programming language is also used to implement the training process.

At the beginning of the training, the training images are loaded from disk and saved on the computer memory. Then the network weights are initialized based on the initialization method described above. Then the label generator network 170 weights are initialized to match the weights of the original network (Step 210 of FIG. 2).

Then the training cases are looped through one by one. The images are fed into the network as 32×32×3 arrays of 32-bit floating point numbers. The labels are fed to the network as ten-dimensional vectors of zeros and ones. For each digit class, the element of the label vector with the corresponding index is set to one and the others to zero (this is known as one-hot encoding). Each training example is processed by both the label generator 170 to generate a label (Step 220 of FIG. 2). Then the training example is processed by the original network 160, and the optimizer is used to change weights of the original network 160 in order minimize the total cost (Step 230 of FIG. 2).

Then the label generator 170 weights are updated (Step 240 of FIG. 2). Then the hyperparameters are updated as described by the schedule above (Step 250 of FIG. 2). Then the training proceeds to the next training case.

After the network has been trained for set number of epochs, the training stops. In response to the end of the training the label predictor may be taken with its current weights and use it for the image recognition task. It is possible to input any image of the correct format (32×32 RGB) to the label predictor and it will predict what digit is present in that image (cf. the Street View House Number application).

For example, in the described manner it is possible to implement a computer program that uses the compiled computation graph and the final weights of the label generator, and implements an HTTP interface that may be accessed through the internet. The interface listens to HTTP POST requests sent to a chosen URL. When it receives a POST request of a valid format, it may be configured to check that the request contains a valid image. If this is the case it may then process it through the label generator 170, and send the resulting label prediction as the HTTP response. This kind of application may be offered as a service to companies that need digit recognition capabilities. In comparison to other such services, the solution based on the inventive idea of the present invention requires less data for training, and give better predictions in the absence of high-quality training labels.

Next, the fundamental idea according to the present invention is described through an example wherein the inventive idea of the present invention is applied to audio recognition system. Namely, the method according to an embodiment of the invention may be used for building an effective audio recognition system. The audio recognition is applied to transcribing speech to text. The goal in this application area is to learn to transcribe speech to text in an audio sample with the method according to the present invention.

The required training labels may be obtained from the TIMIT Acoustic-Phonetic Continuous Speech Corpus which has transcribed speech from 630 speakers sampled at 16 kHz. Additional labels may be obtained from additional corpus of unlabeled speech by applying the label generator 170. The embodiment may be the same as with the previous image recognition example with the following changes:

- Instead of feeding the network with raw audio samples, mel-frequency cepstral coefficients (MMFC) may be used. They are commonly used as features in speech recognition. This will result in a representation which has a number of MMFC feature values for each time frame. In this example we have 20 MFCCs for each 10 ms time frame.
- Instead of 32×32×3 input layer we may have 32×1×20 input layer for which 32 consecutive MFCCs are fed (spatial convolution is replaced by temporal convolution).
- Training samples are generated with 10 ms shifted time windows. The target label is obtained from the TIMIT dataset taking the phoneme classification at the center of the time window.
- The data augmentation layer may be skipped.
- The max pooling layers may have kernel size 2×1.
- The last fully connected layer has 61 rather than 10 outputs because the TIMIT dataset has 61 phoneme categories. The trained network may thus output a phoneme classification at 10 ms intervals.
- The phoneme classifications may be fed to a separately trained transcription system which is commonly used in automatic speech recognition. A hidden Markov model may be used.

For the general purpose it shall be mentioned that the neural network system comprising an original neural network 160 and a label generator 170 may be implemented by one or more processors. Hence, the operations described as a method steps in the description herein may be considered as a processing "nodes" and one or more nodes may be implemented by a processor. Further, a memory may be provided for storing computer program code causing the processors, and thus the computing devices in use, to perform as described when the computer program code is executed by one or more processors. The memory may also store weights, such as learned weights, or generated weights. The memory may further store a training dataset comprising training data. The training data may, for example, be used for image classification in which case the training data may comprise images with known classifications. The memory may further store a validation set comprising validation data.

It will also be appreciated that any module, unit, component, server, computer, terminal or device exemplified herein that executes instructions may include or otherwise have access to a computer readable product comprising at least one computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A computer-implemented method for training a neural network system comprising an original neural network and a label generator, the method comprises:
   obtaining a number of training cases comprising input data and wherein at least one training case is labeled; and
   training the neural network system by a sequence of training steps where at each training step at least one of the following operations is performed:
   training the original network by processing a subset of the labeled training cases with labels,
   generating a label with the label generator for a subset of the training cases and training the original network with the generated label, or
   updating weights of the label generator based on its current weights and weights of the original network in response to an outcome of the training of the original network, wherein updating the weights of the label generator based on its current weights and the weights of the original network in response to an outcome of the training of the original network comprises determining each of the weights of the label generator as a weighted average of a corresponding one of the current weights of the label generator and a corresponding one of the weights of the original network,
   wherein each of the operations gets performed at least once during training of the neural network system.

2. The computer-implemented method of claim 1, wherein training the original network comprises minimizing a combination of a classification cost between a predicted label by the original network and the original label and a consistency cost between the predicted label by the original network and the generated label by the label generator.

3. The computer-implemented method of claim 2, wherein the combination of the classification cost and the consistency cost is a weighted average of the classification cost and the consistency cost.

4. The computer-implemented method of claim 1, wherein the qweighted average is determined using a smoothing coefficient.

5. The computer-implemented method of claim 1, wherein the updating the weights of the label generator based on its current weights and the weights of the original network in response to an outcome of the training of the original network comprises updating the weights of the label generator based only on the current values of the weights of the label generator and corresponding ones of the weights of the original network.

6. The computer-implemented method of claim 1, wherein the weights of the label generator are initialized to match the weights of the original network.

7. The computer implemented method of claim 1, wherein generating a label with the label generator comprises mutating at least some outputs of intermediate layers of the label generator.

8. A neural network system comprising one or more computers and one or more storage devices storing instructions that, when executed by the one or more computers, cause the one or more computers to perform:
obtaining a number of training cases comprising input data and wherein at least one training case is labeled; and
training the neural network system by a sequence of training steps where at each training step at least one of the following operations is performed:
training the original network by processing a subset of the labeled training cases with labels,
generating a label with the label generator for a subset of the training cases and training the original network with the generated label, or
updating weights of the label generator based on its current weights and weights of the original network in response to an outcome of the training of the original network, wherein updating the weights of the label generator based on its current weights and the weights of the original network in response to an outcome of the training of the original network comprises determining each of the weights of the label generator as a weighted average of a corresponding one of the current weights of the label generator and a corresponding one of the weights of the original network,
wherein each of the operations gets performed at least once during training of the neural network system.

9. The neural network system of claim 8, wherein
training the original network comprises minimizing a combination of a classification cost between a predicted label by the original network and the original label and a consistency cost between the predicted label by the original network and the generated label by the label generator.

10. The neural network system of claim 9, wherein the combination of the classification cost and the consistency cost is a weighted average of the classification cost and the consistency cost.

11. The neural network system of claim 8, wherein the weighted average is determined using a smoothing coefficient.

12. The neural network system of claim 8, wherein the updating the weights of the label generator based on its current weights and the weights of the original network in response to an outcome of the training of the original network comprises updating the weights of the label generator based only on the current values of the weights of the label generator and corresponding ones of the weights of the original network.

13. The neural network system of claim 8, wherein the weights of the label generator are initialized to match the weights of the original network.

14. The neural network system of claim 8, wherein generating a label with the label generator comprises mutating at least some outputs of intermediate layers of the label generator.

15. A non-transitory computer-readable storage device including program instructions executable by one or more processors that, when executed, cause the one or more processors to perform operations comprising:
obtaining a number of training cases comprising input data and wherein at least one training case is labeled; and
training the neural network system by a sequence of training steps where at each training step at least one of the following operations is performed:
training the original network by processing a subset of the labeled training cases with labels,
generating a label with the label generator for a subset of the training cases and training the original network with the generated label, or
updating weights of the label generator based on its current weights and weights of the original network in response to an outcome of the training of the original network, wherein updating the weights of the label generator based on its current weights and the weights of the original network in response to an outcome of the training of the original network comprises determining each of the weights of the label generator as a weighted average of a corresponding one of the current weights of the label generator and a corresponding one of the weights of the original network,
wherein each of the operations gets performed at least once during training of the neural network system.

16. The non-transitory computer-readable storage device of claim 15, wherein training the original network comprises minimizing a combination of a classification cost between a predicted label by the original network and the original label and a consistency cost between the predicted label by the original network and the generated label by the label generator.

17. The non-transitory computer-readable storage device of claim 16, wherein the combination of the classification cost and the consistency cost is a weighted average of the classification cost and the consistency cost.

18. The non-transitory computer-readable storage device of claim 15, wherein the weighted average is determined using a smoothing coefficient.

19. The non-transitory computer-readable storage device of claim 15, wherein the updating the weights of the label generator based on its current weights and the weights of the original network in response to an outcome of the training of the original network comprises updating the weights of the label generator based only on the current values of the weights of the label generator and corresponding ones of the weights of the original network.

20. The non-transitory computer-readable storage device of claim 15, wherein the weights of the label generator are initialized to match the weights of the original network.

21. The non-transitory computer-readable storage device of claim 15, wherein generating a label with the label generator comprises mutating at least some outputs of intermediate layers of the label generator.

\* \* \* \* \*

UNITED STATES PATENT AND TRADEMARK OFFICE
CERTIFICATE OF CORRECTION

PATENT NO. : 11,620,511 B2
APPLICATION NO. : 16/486576
DATED : April 4, 2023
INVENTOR(S) : Harri Valpola It is certified that error appears in the above-identified patent and that said Letters Patent is hereby corrected as shown below:

In the Claims

At Column 13, Claim number 4, Line number 6:
"the qweighted average" should be --the weighted average--.

Signed and Sealed this
Twenty-third Day of May, 2023

Katherine Kelly Vidal
Director of the United States Patent and Trademark Office